United States Patent [19]

Riess

[11] 4,277,661

[45] Jul. 7, 1981

[54] BASIC ELECTRIC SWITCH WITH AN ADDITIONAL SWITCH PORTION

[75] Inventor: Axel Riess, Tuttlingen, Fed. Rep. of Germany

[73] Assignee: J. & J. Marquardt, Fed. Rep. of Germany

[21] Appl. No.: 73,114

[22] Filed: Sep. 6, 1979

[30] Foreign Application Priority Data

Sep. 7, 1978 [DE] Fed. Rep. of Germany ... 7826545[U]

[51] Int. Cl.³ ........................ H01H 13/08; H02P 7/00

[52] U.S. Cl. .................................. 200/157; 200/1 V; 200/307

[58] Field of Search ................... 200/155 R, 157, 303, 200/243, 307, 1 V

[56] References Cited

U.S. PATENT DOCUMENTS

| | | | |
|---|---|---|---|
| 3,260,827 | 7/1966 | Frenzel | 200/157 |
| 3,467,801 | 9/1969 | Matthews | 200/157 |
| 3,637,967 | 1/1972 | Bruun | 200/155 R |
| 3,649,780 | 3/1972 | Johnson | 200/155 R |
| 3,755,640 | 8/1973 | Kaman et al. | 200/157 |
| 3,814,886 | 6/1974 | Piber | 200/157 |
| 4,097,704 | 6/1978 | Piber | 200/157 |
| 4,100,383 | 7/1978 | Piber | 200/157 |

*Primary Examiner*—John W. Shepperd

*Attorney, Agent, or Firm*—McGlew and Tuttle

[57] ABSTRACT

A basic electrical switch comprises a first housing part with a first switch contact mounted therein and a first actuator associated with the first switch contact for actuating it and a second housing having a second switch contact therein and a second actuator connected thereto for actuating the second switch contact and including a snap connection for interconnecting the first and second housings together.

4 Claims, 4 Drawing Figures

BASIC ELECTRIC SWITCH WITH AN ADDITIONAL SWITCH PORTION

FIELD AND BACKGROUND OF THE INVENTION

This invention relates in general to switch construction and in particular to a new and useful switch which comprises a basic switch having its own actuator and switch contact and an additional switch which may be interconnected with the basic switch and its own switch contact and actuator.

It is well known to accommodate in a common housing two switches of which one serves as a basic or main switch and the other as an additional switch. For reasons of economy, however, it is not advisable to operate the entire switch assembly also during periods where the additional switch is not needed for performing the operation.

SUMMARY OF THE INVENTION

The invention is therefore, directed to a switch of the above mentioned kind taking account of this factor of economy.

In accordance with the invention there is provided a basic switch construction which includes a first housing having an actuator for actuating a switch contact and an additional housing, adapted to be interconnected to the first housing, and having additional switch contact and actuator.

If only the basic switch is needed, no connection is established to the additional switch, while if the operation requires both switches, they are connected to each other and used as a unit. In manufacture, this has the advantage of making possible a production on a larger scale, with one part of the series production being usable separately and the other part being employed with an additional switch. It is further possible to provide a basic switch hitherto employed alone, later with an additional switch, to augment the performance.

The additional switch housing advantageously is of U-shaped construction with two spaced apart legs which engage over the housing of the first switch and provide a snap action interconnection therebetween.

Advantageously, the engaging elements are carried on the outer walls of the basic switch while the corresponding recesses are provided in the casing of the additional switch. If a rotation or displacement is reliably prevented otherwise, it is sufficient to provide a single snap-action or click-stop element on each of the U-legs.

The basic switch advantageously comprises a pushbutton switch which forms a blocking member for an actuating member or lever of the additional switch. Consequently the additional switch can be actuated only if the pushbutton is not depressed. With the additional switch in either of its switching positions, the basic switch can be operated without hinderance, that is switched on or off as frequently as needed. However, if the pushbutton is pressed down even only partly, the once chosen end position of the actuating member of the additional switch can no longer be changed.

The actuating member of the additional switch is advantageously a pivotally mounted swing lever which includes a nose which bears against a member which may be pivoted from one side to the other and includes a projection which is guided on a portion of the housing of the basic switch which may be engaged into a recess or against a raised portion of the basic switch to lock it in a selected position.

The two recesses extend parallel to each other, in the direction of displacement of the pushbutton. They are so dimensioned that the projection of the swing lever becomes engaged in one of the recesses upon on a very slight pressure on the pushbutton, whereby the lever is prevented from moving. On the other hand, the lengths of the recesses must be sufficient, to prevent the projection from hindering the displacement of the pushbutton.

The additional switch advantageously includes a swing lever actuator which is held in one of its end positions by means of a return spring.

This design is of importance particularly if the inventive switch is mounted in hand-operated electric tools, primarily in hand drills. By means of the basic switch, for example, the tool may be switched on and off, while the additional switch may be used for reversing the rotation of the drive motor. This last mentioned construction makes sure that after any disconnection of the motor, the next wanted direction of rotation will instantly be available upon switching on again. Thus, it cannot happen that upon restarting the work with the tool, the rotation would be incorrect and might cause an accident. The reverse rotation can positively be obtained only by an intentional actuation of the additional switch. Moreover, the possibility is eliminated of reversing the rotation by putting the tool aside with its weight on the switch. Even if the actuating member of the additional switch is unintentionally displaced in this way, it returns automatically into its basic position after the tool is lifted again, this basic position insuring, for example, a rotation in the clockwise direction.

Advantageously, at least one of the U-legs of the casing of the additional switch receives one or more connecting terminals, in particular screwless ones. Preferably, each screwless connecting terminal comprises a connecting lug or another electrically conducting element, and a pressure spring, for example, a leaf spring, extending obliquely thereto and giving way as the conductor is inserted. The conductor is then claimped fast by the leaf spring acting as a barb or detent.

Still another advantageous variant of the invention comprises a construction with two terminals in each U-leg. In this design the additional switch is a double pole reversing switch with which the poles of the connected field coils of an electric motor of a hand-operated tool particularly hand drill, can be reversed in accordance with what has been mentioned above. The pivotal motion of the swing lever is transmitted to the two longitudinally displaceable contact bridges by means of a rotary member which is coupled to the swing lever and separates the two bridges from each other. This mechanism is necessary to effect a displacement of the bridges substantially in the longitudinal direction of the swing lever in a mid position.

Accordingly, it is an object of the invention to provide a switch construction which comprises a first housing part having a first switch contact mounted therein and a first actuator means associated with said first switch contact to actuate it and a second housing part having a second switch contact mounted therein and a second actuator associated with said second switch contact for actuating said second switch contact further including a snap-action connector construction defined between the first and second housings to hold them together in an operative interengagement.

A further object of the invention is to provide a switch construction in which two switch housings may be interconnected together and wherein one of these switch housings include an actuator for the contacts which is arranged adjacent the actuator for the contacts of the switch in the second housing so as to provide a guide and a locking means therefor, said actuators comprising advantageously a slide actuator and a pivotal lever actuator.

A further object of the invention is to provide a switch construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
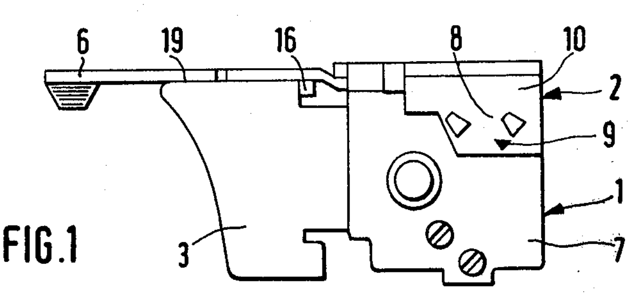
FIG. 1 is a side elevational view of a switch constructed in accordance with the invention.

Referring to the drawings in particular the invention embodied therein comprises a switch construction which comprises a first housing 1 having a first switch contact mounted therein and first actuating means 3 associated with the contact for actuating it and a second housing part 2 which is engageable with the first housing part 1 which has a second switch contact means in form of contact bridges 32, and 33 therein which are actuated by a second actuator means in the form of a swing lever 6.

The inventive switch assembly comprises a basic switch 1 and an additional switch 2. The basic switch is designed with a pushbutton or actuator 3 and a locking pin 4 for retaining the pushbutton in a completely depressed actuated position. The additional switch 2 is designed, in the present example, as a two pole reversing switch actuated by an elongated swing lever 6 which is pivotable about a pin 5. In accordance with the invention, basic switch 1 and additional switch 2 are connected to each other by snapping engagement. For this purpose, the casing of additional switch 2 is designed with a U-shaped cross section, so that it can be engaged over the housing of the basic switch, in particular over the narrow side thereof. The snap connection comprises an engaging element 8 secured to, preferably formed on, both the broad side of the basic switch casing 7, shown in the drawing plane of FIG. 1, and the opposite side of the housing parallel thereto, and recesses 9 which are provided in the associated insides 11, 12 of the housing or casing 10 of additional switch 2 and into which the elements 8 engage in the assembled state of the switch. Casing 10 of additional switch 2 has a U-shaped cross section, considered in the plane perpendicular to the drawing plane of FIG. 2 and insides 11, 12 are the inner surfaces of the U-legs or portions 13 and 14 of the casing. Casing 10 is made of a plastic and is sufficiently elastic, so that additional switch 2 can easily be engaged over and removed from basic switch 1.

Figure 2:
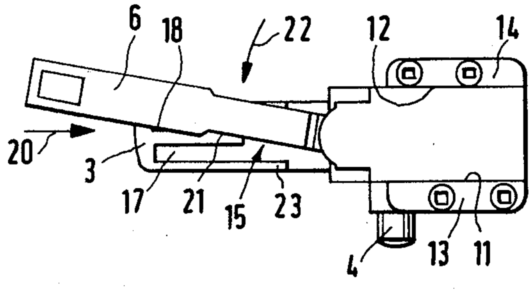
FIG. 2 is a top plan view of the switch shown in FIG. 1.

Pushbutton 3 of basic switch 1 is also effective, at the same time, to operate as a locking member for the swing lever 6 of additional switch 2. In the initial position of pushbutton 3 shown in FIG. 1, for example, swing lever 6 is unlocked. A lock or locking mechanism 15 comprises a stud-like locking member 16 projecting from swing lever 6, and two guide-like recesses 17, 18, respectively associated therewith, that extend in the upper surface 19 of pushbutton 3 of basic switch 1 on either side of land strip 21. In the end position of the swinging motion of lever 6, shown in FIG. 2, locking member 16 is associated with recess 18. As soon as push button 3 is slightly depressed in the direction of arrow 20, land strip 21 prevents spring lever 6 from pivoting in the direction of arrow 22. The same applies if locking member 16, prior to depressing pushbutton 3, is associated with recess 17. It follows therefrom that the presence of land strip 21 is sufficient for achieving the locking effect. Strip 23, or the corresponding strip of recess 18 which, in FIG. 2, is concealed by swing lever 6, have the sole purpose of protecting locking member 16. Basic switch 1 is a conventional single- or double-pole switch with normally-open or normally-closed contacts, or a reversing switch. Additional switch 2, in the shown example, is a two pole reversing switch, but may also be of any other known construction. Swing lever 6 is designed as a two arm lever, with a first lever arm 24 being effective as an actuating handle, while a second lever arm 25 is provided with a nose 26 engaging a recess 27 of a rotary member 28. The rotary member 28 accommodates two dogs 30, 31 at respective opposite ends which are mounted for displacement and loaded by a common helical compression spring 29. The pin-like ends of dogs 30, 31 engage correspondingly shaped apertures in associated contact bridges 32, 33. Consequently, a rotation of member 28 in the direction of arrow 34 displaces contact bridge 33 longitudinally from the right to the left hand side, and contact bridge 32 in the opposite direction. The rotary motion of member 28 is limited by two stops 35 and 36.

Figure 4:
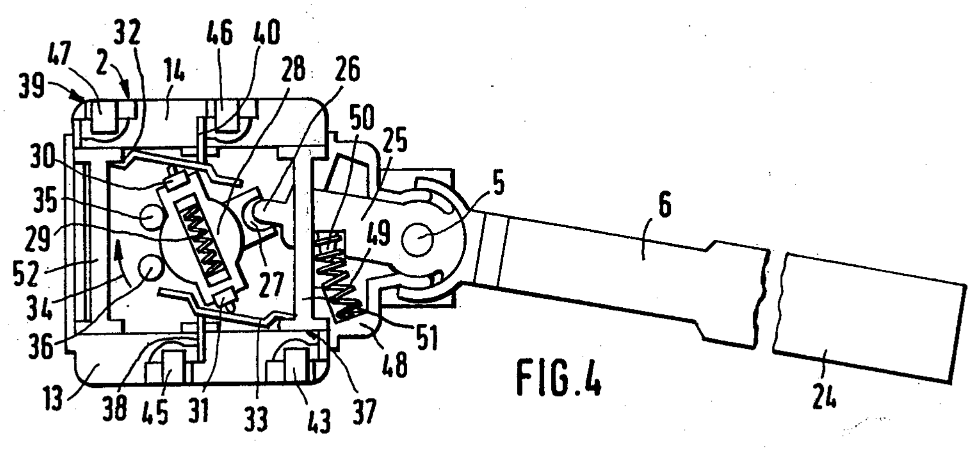
FIG. 4 is a top plan view of the additional switch shown in FIG. 3 with the casing cover removed therefrom.

Incorporated in U-leg 13 of casing 10 of the additional switch 2 is a downwardly extending (FIG. 4) angle leg of an angled connecting lug 37, and a substantially straight connecting lug 38 extending parallel thereto. Analogously, a leg of an angled connecting lug 39 and a substantially straight connecting lug 40 are incorporated in the other U-leg 14 of casing 10. In the angular position of rotary member 28 shown in FIG. 4, contact bridge 32 electrically connects angled connecting lug 39 to straight connecting lug 40, while contact bridge 33 connects angled connecting lug 37 to straight connecting lug 38. The other legs 51, 52 of angled connecting lug 37 and 39, respectively, extend parallel to each other, in the drawing plane of FIG. 4 laterally past rotary member 28, and their free ends extend up to the opposite U-leg. Also in a top view, they have the shape of a double T. In the other, not shown, rotary end position of member 28, contact bridge 33 connects straight connecting lug 38 to angled connecting lug 39, and contact bridge 32 connects straight connecting lug 40 to angled connecting lug 37.

Figure 3:
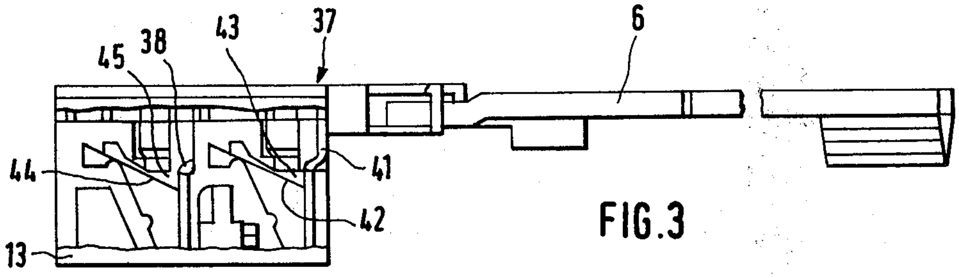
FIG. 3 is an enlarged side elevational view of the additional switch shown in FIG. 1, partly broken away.

In FIG. 3, the angle leg 41 of angled connecting lug 37 and straight connecting lug 38 are shown. Angle leg 41 along with a leaf spring 42 fixed in the casing, form a screwless connecting terminal 43, while straight connecting lug 38 along with a corresponding leaf spring 44 form a screwless connecting terminal 45. At the opposite side, similarly designed screwless terminals 46 and 47 are provided which, however, are offset relative to terminals 43, 45 in the longitudinal direction of swing lever 6. To ensure that the additional switch will always return into its initial switching position shown in FIG. 4, a helical compression spring 49 is provided between one casing wall 48 and the second arm 25 of swing lever 6. One end of the spring is attached to a pin 50 of swing lever 6, and the other end bears against the cover or another top portion of the casing.

While specific embodiments of the invention have been shown and described in detail to illustrate the application of the principles of the invention, it will be understood that the invention may be embodied otherwise without departing from such principles.

What is claimed is:

1. A switch construction comprising a first housing part, a first switch contact means mounted in said first housing part, first actuating means associated with said first switch contact means for actuating said first switch contact means, a second housing part, second switch contact means mounted in said second housing part, second actuator means associated with said second switch contact means for actuating said second switch contact means, snap connection means interconnecting said first and second housing parts, wherein said first actuator means comprises a pushbutton, said second actuator means comprises a pivotal lever mounted for pivotal movement on said second housing part adjacent said pushbutton and locking means associated with said lever and said pushbutton for locking said lever in respect to said pushbutton comprising detent locking means defined between said lever and said pushbutton comprising a projection on one of said lever and said pushbutton engageable into a recess portion of the other of said lever and pushbutton, a return spring connected to said lever for holding said lever in an end position and a plurality of connecting terminals engaged on respective portions of said first and second housing parts, said second housing part having spaced apart leg portions containing at least one of said connecting terminals.

2. A switch construction according to claim 1, wherein said second housing part has two connecting terminals in each leg portion, an angle shaped connecting lugs extending between said leg portions, said lugs having angle legs offset in the actuating direction of pushbutton actuator, said second housing part having a straight connecting lug in each leg portion intermediate said angle shaped connecting lugs and two contact bridges disposed in said second housing part and being longitudinally displaceable therein, said swing lever being actuable to displace said contact bridges and establish connection between one of the two straight connecting lugs and one of the angle-shaped connecting lugs.

3. A switch construction comprising a first housing part, a first switch contact means mounted on said first housing part, a push button associated with said first switch contact means for actuating said first switch contact means, a second housing part, second switch contact means mounted in said second housing part, second actuator means associated with said second switch contact means for actuating said second switch contact means, said second actuator means comprising a pivotal elongated lever mounted for pivotal movement on said second housing adjacent said pushbutton and locking means associated with said lever and said pushbutton for locking said lever in respect to said pushbutton, snap connection means interconnecting said first and second housing parts, said second housing part having a U-shaped configuration including spaced apart side legs which are engageable over said first housing part, said leg portions having snap connection elements defining said snap connection means for interconnecting said first and second housing parts, detent locking means defined between said lever and said pushbutton comprising a projection on one part engageable into a recess portion of the other part, a return spring connected to said lever for holding said lever in an end position, and a plurality of connecting terminals engaged on respective portions of said first and second housing parts, said second housing part having spaced apart leg portions containing at least one of said connecting terminals.

4. A switch construction according to claim 3, wherein said second housing part has two connecting terminals in each leg portion, angle-shaped connecting lugs extending between said leg portions, said lugs having angle legs offset in the actuating direction of pushbutton actuator, said second housing part having a straight connecting lug in each leg portion intermediate said angle shaped connecting lugs and two contact bridges disposed in said second housing part and having longitudinally displaceable therein, said swing lever being actuable to displace said contact bridges and establish connection between one of the two straight connecting lugs and one of the angle-shaped connecting lugs.

* * * * *